United States Patent [19]

Yehushua et al.

[11] Patent Number: 5,504,800
[45] Date of Patent: Apr. 2, 1996

[54] CELLULAR AUTOMATED TEST SET

[75] Inventors: Moshe Yehushua, San Diego; Nancy Neigus, Cardiff by the Sea; Phil Labarbera, Poway, all of Calif.

[73] Assignee: Hughes Aircraft Company, Los Angeles, Calif.

[21] Appl. No.: 223,482

[22] Filed: Apr. 4, 1994

[51] Int. Cl.$^6$ .................... H04M 1/24; H04M 3/08; H04M 3/22

[52] U.S. Cl. .................. 379/27; 379/1; 379/23; 379/26; 379/32

[58] Field of Search ................. 379/1, 23, 27, 379/26, 32, 58, 59; 455/67.1, 67.4

[56] References Cited

U.S. PATENT DOCUMENTS

| | | | |
|---|---|---|---|
| 4,554,410 | 11/1985 | Furumoto | 379/27 |
| 4,788,711 | 11/1988 | Nasco, Jr. | 379/59 |
| 4,977,399 | 12/1990 | Price | 455/67.4 |
| 5,023,900 | 6/1991 | Tayloe | 379/32 |
| 5,027,427 | 6/1991 | Shimizu | 455/67.4 |
| 5,070,536 | 12/1991 | Mahany | 455/67.4 |
| 5,084,869 | 1/1992 | Russell | 370/85.7 |
| 5,134,643 | 7/1992 | Iwata | 379/27 |
| 5,175,867 | 12/1992 | Wejke | 455/67.1 |
| 5,201,063 | 4/1993 | Tam | 455/67.4 |
| 5,289,526 | 2/1994 | Chymyck | 455/67.1 |

Primary Examiner—Stephen Chin
Assistant Examiner—Vijay Shankar
Attorney, Agent, or Firm—Gordon R. Lindeen, III; Wanda K. Denson-Low

[57] ABSTRACT

A cellular automated test set for testing cellular telephones consists of a RF interface coupled to an RF input/output of the cellular telephone and a transmitter-receiver coupled at an RF input/output of the transmitter-receiver to the RF interface. The transmitter-receiver transmits a first message signal to and receives a second message signal from the cellular telephone via the RF interface. The second message signal is generated by the cellular telephone in response to the first message signal. A data interface is coupled to a data port of the transmitter-receiver; and a processor is coupled to the data interface. The processor transmits a first data signal to and receives a second data signal from the transmitter-receiver via the data interface. The first message signal is generated in response to the first data signal and the second data signal is generated in response to the second message signal. In practice, the processor may be a personal computer system and the transmitter-receiver may be a modified cellular telephone programmed with a base station program.

13 Claims, 6 Drawing Sheets

CELLULAR AUTOMATED TEST SET

BACKGROUND OF THE INVENTION

The present invention relates to cellular telephone communications, and more particularly to the testing of cellular telephone communications equipment. Even more particularly, the present invention relates to testing cellular telephones used in cellular telephone communications.

Testing of cellular telephones is typically carried out by coupling an RF input/output of a cellular telephone (or unit under test) to an RF input/output of a cellular telephone testing unit. A typical testing unit is a highly specialized piece of equipment and is capable of delivering a limited number of messages to the unit under test and checking for an appropriate response from the unit under test.

In order to check for the appropriate response, the testing unit checks an actual response of the unit under test against the appropriate response stored in a memory device. The memory device is typically a programmable read only memory (PROM) device.

Problematically, such testing units do not allow all possible messages to be sent to the unit under test, and therefore cannot test for the appropriate responses to all of the possible messages.

A further problem with such testing units is that they are not easily adaptable to new cellular telephone standards/protocols. For example, currently, TDMA Digital cellular telephone communication systems used in the United States are designed to comply with a standard known as the EIA/TIA/IS-54-B standard. See Electronic Industries Association/Telecommunications Industry Association Cellular System Dual-Mode Mobile Station—Base Station Compatibility Standard EIA/TIA/IS-54-B, incorporated herein by reference. When new standards are adopted, as commonly occurs in developing industries such as cellular telephone communications, the testing units must be opened, the PROM removed, and an updated PROM, which conforms to the new standard, installed; or at the least a ROM card must be removed from a slot in the testing unit and a new ROM card installed.

An additional problem with existing testing units is that such testing units are large dedicated bench-top units. Such testing units are quite expensive, and can serve only the limited purpose of cellular telephone testing.

By providing an improved apparatus and method for testing a cellular telephone and method for making the apparatus, the present invention advantageously addresses the above and other needs.

SUMMARY OF THE INVENTION

The present invention advantageously addresses the needs above as well as other needs by providing an apparatus and method for testing cellular telephones used in cellular telephone communications and a method for making the apparatus.

The invention can be characterized as an apparatus for testing a cellular telephone with an RF input/output. The apparatus includes: (1) an RF interface unit coupled to the RF input/output of the cellular telephone; and (2) a transmitter-receiver unit coupled at an RF input/output of the transmitter-receiver unit to the RF interface unit. The transmitter-receiver unit transmits a first message signal to and receives a second message signal from the cellular telephone via the RF interface unit. The second message signal is generated by the cellular telephone in response to the first message signal. The apparatus also includes: (3) a data interface unit coupled to a data port of the transmitter-receiver unit; and (4) a processor coupled to the data interface unit. The processor transmits a first data signal to and receives a second data signal from the transmitter-receiver unit via the data interface unit. The first message signal is generated in response to the first data signal and the second data signal is generated in response to the second message signal.

In practice, the processor may be a personal computer system and the transmitter/receiver unit may be a modified cellular telephone programmed with a base station program.

The invention may also be characterized as an apparatus for testing a first cellular telephone that communicates using a mobile unit protocol, the apparatus includes: (1) an RF interface unit coupled to an RF input/output of the first cellular telephone; and (2) a second cellular telephone coupled at an RF input/output of the second cellular telephone to the RF interface unit. The second cellular telephone transmits a first message to and receives, in response thereto, a second message from the first cellular telephone via the RF interface unit. The apparatus further includes: (3) a memory device within the second cellular telephone that stores a base station program. The base station program defines a base station protocol, such that the second cellular telephone communicates with the first cellular telephone via the RF interface unit using the base station protocol.

The invention can further be characterized as a method for making a cellular automated test set, the method includes coupling a first cellular telephone (the cellular telephone being tested or cellular telephone under test) at an RF input/output of the first cellular telephone to an RF interface unit, wherein the first cellular telephone is programmed with a mobile unit program; coupling the RF interface unit to a second cellular telephone at an RF input/output of the second cellular telephone; and programming the second cellular telephone with a base station program. The first cellular telephone uses a mobile unit protocol implemented in the mobile unit program in response to the mobile unit program to transmit a first message signal to the second cellular telephone and the second cellular telephone uses a base station protocol implemented in the base station program in response to the base station program to transmit a second message signal to the first cellular telephone. Finally, the method includes coupling the second cellular telephone to a processor via a data interface unit, wherein the second cellular telephone transmits and receives data signals to and from the processor via the data interface unit; and programming the processor with a control program in response to which the processor generates the data signals. Preferably, the control program is software capable of generating data signals in response to which all of a plurality of possible second message signals (defined by e.g., the EIA/TIA/IS-54-B standard) can be selectively generated within the second cellular telephone and sent to the first cellular telephone. The second cellular telephone transmits the second message signal to the first cellular telephone using the base station protocol in response to the data signals.

Finally, the invention may also be characterized as a method of testing a cellular telephone including, transmitting, from a processor, a first data signal; receiving, in a transmitter/receiver unit, the first data signal; transmitting, from the transmitter/receiver unit, in response to receiving the first data signal, a first RF signal; and receiving, in the cellular telephone, the first RF signal. Next, the method includes transmitting, from the cellular telephone, a second RF signal, in response to receiving the first RF signal; receiving, in the transmitter/receive unit, the second RF signal; transmitting, from the transmitter/receiver unit, in response to receiving the second RF signal, a second data signal; and receiving, in the processor, the second data signal. Finally, the method includes determining whether the second data signal is an appropriate response to the first data signal, i.e., determining whether the second data signal complies with, e.g., the EIA/TIA/IS-54-B standard or another cellular telephone communications standard; and generating an error signal if the second data signal is not an appropriate response to the first data signal, i.e., does not comply with, e.g., the EIA/TIA/IS-54-B standard.

It is therefore a feature of the invention to provide an apparatus and method for testing cellular telephones using any of a plurality of possible messages (defined by e.g., the EIA/TIA/IS-54-B standard) that can be transmitted by the transmitter/receiver unit or second cellular telephone.

It is another feature of the invention to provide such apparatus and method that can be easily adapted for use with new cellular telephone standards.

It is a further feature of the invention to provide such apparatus and method that can be adapted for use with new cellular telephone messages without the need for opening such apparatus and replacing a PROM.

It is an additional feature of the invention to provide such apparatus and method that can at least in part be used for additional purposes other than the testing of cellular telephones.

It is an added feature of the invention to provide such apparatus and method that is low cost relative to dedicated bench-top cellular telephone testing units.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
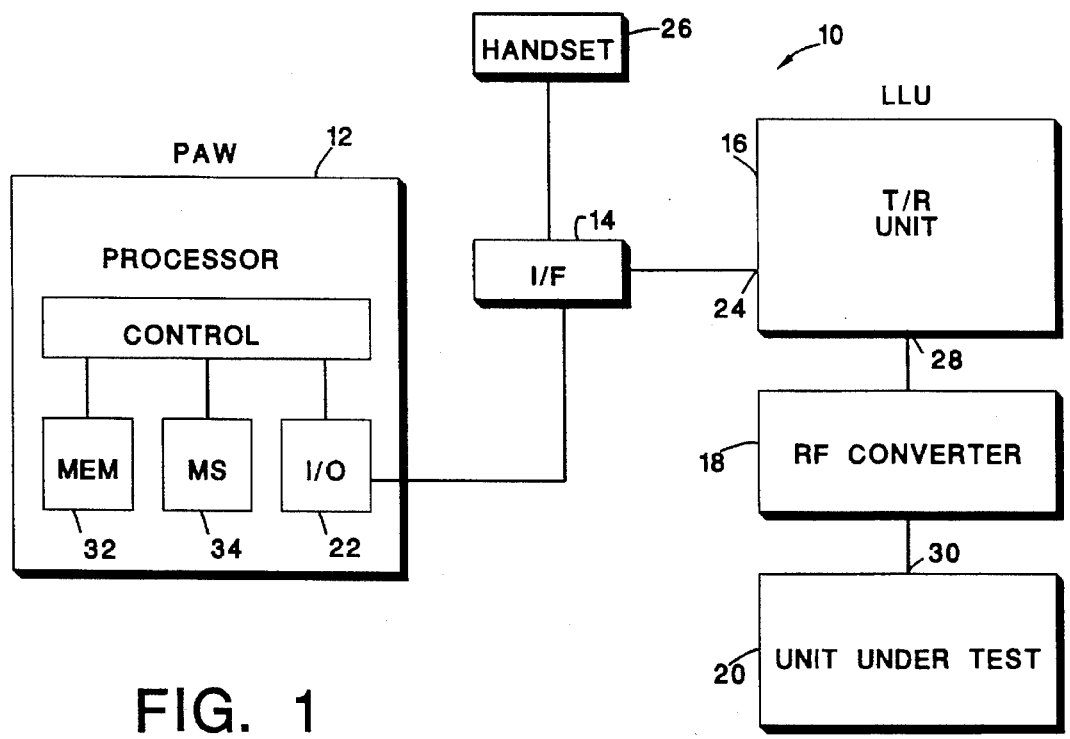
FIG. 1 is a block diagram of an apparatus for testing cellular telephones (or cellular automated test set) made in accordance with the present invention.

Referring first to FIG. 1, a block diagram is shown of an apparatus for testing cellular telephones 10 made in accordance with the invention. The apparatus 10 (or cellular automated test set (CATS)) includes (1) a primary access workstation 12 (PAW), also referred to herein as a processor or base station simulator (BSS); (2) a data interface unit 14, also referred to herein as a test interface box (TIB); (3) a link layer unit 16 (LLU), also referred to herein as a transmitter/receiver unit or second cellular telephone; and (4) a radio frequency (RF) interface 18. The CATS 10 is coupled to a unit under test 20 (UUT), i.e., a fist cellular telephone, on which tests are to be performed. The first cellular telephone is also referred to herein as a cellular telephone under test.

The processor 12 is coupled to the data interface unit 14 at a data port 22 on the processor, and the data interface unit 14 is coupled to the transmitter/receiver unit 16 at a data port 24 on the transmitter/receiver unit 16. Also shown is a testing handset 26 coupled to the transmitter/receiver unit 16 via the data interface unit 14. The testing handset 26 is of conventional design available as, e.g., model number M6100 from Hughes Network Systems of San Diego, Calif. The transmitter/receiver unit 16 is also coupled to an RF interface unit 18 at an RF input/output 26 of the transmitter/receiver unit 16, and the RF interface unit 18 is coupled to the cellular telephone under test 20 at an RF input/output 30 of the cellular telephone under test 20.

The processor 12 is preferably a personal computer such as an INTEL 386 microprocessor-based personal computer. Within the processor 12 is a memory 32 and a mass storage device 34, such as a magnetic hard disk drive. The memory 32 is programmed with the control program described below. The data 22 port on the processor 12 is preferably an RS-232 interface of the type commonly known in the art.

The data interface unit 14 is coupled to the data port 22 and, in the preferred embodiment, converts twelve-volt, e.g., RS-232, data signals to/from the data port of the processor 12 into five-volt, e.g., TTL, data signals. The data interface unit 14 is also coupled to the testing handset 26 and the transmitter/receiver unit 16, which send and receive the TTL data signals. Thus, the twelve-volt data signals from the data port of the processor 12 are passed to the transmitter/receiver unit 16 in the form of TTL data signals. Similarly, the transmitter/receiver unit 16 generates TTL signals that are converted into twelve-volt data signals and are passed through to the processor 12. The data interface unit 14 is realized using integrated circuit level converters such as integrated circuit number MAX232A available from MAXIM of Sunnyvale, Calif. The conversion of twelve-volt data signals to TTL data signals is known in the art and can easily be realized by one skilled in the art using the above-mentioned integrated circuits or the like.

In an alternative embodiment, the data interface unit may not need to convert the TTL data signals to/from twelve-volt data signals, because, e.g., the transmitter/receiver unit 16 may utilize twelve-volt data signals, instead of TTL data signals. Thus, in this alternative embodiment, the data interface unit may consist merely of a data path, e.g., a cable, that couples the processor 12 to the transmitter/receiver unit 16.

As mentioned above, the testing handset 26 is preferably a standard readily available cellular telephone handset, and can be used to test audio quality between the transmitter/receiver unit 16 and the cellular telephone under test 20 by speaking into the a microphone in the testing handset 26 and listening at a speaker that is in the cellular telephone under test's handset, which is a part of the cellular telephone under test 20. Alternatively, audio quality may be tested by speaking into another microphone that is in the cellular telephone under test's handset and listening at another speaker that is in the testing handset 26. One skilled in the art could easily perform such audio testing using the transmitter/receiver unit 16, RF interface unit 18 and cellular telephone under test 20 described herein.

The transmitter/receiver unit 16 is a standard cellular telephone (or second cellular telephone) that contains a base station program instead of a mobile unit program. Such mobile unit programs are typically found in presently available cellular telephones. A suitable transmitter/receiver unit 16, for programming with the base station program, is available as model number M6100 from Hughes Network Systems of San Diego, Calif. In order to program the base station program, the mobile unit program of a standard cellular telephone is modified as follows:

A serial communications routine is added to the existing mobile unit program. The serial communications routine implements a serial protocol between the processor 12 and the transmitter/receiver unit 16. When a data signal is received by the transmitter/receiver unit 16 from the processor 12, the serial communications routine parses the data signal and determines, according to the message's header, whether to send the data signal to an analog mode FSK Modem routine or to a digital mode control routine. The serial communications routine also provides for the transmission of data signals from the transmitter/receiver unit 16 to the processor 12.

The digital mode control routine responds to commands received from the processor 12 via the serial communications routine that relate to a digital mode of operation. The digital mode control routine and a digital modem routine must be modified so that its transmit and receive timing conforms to that of a base station. In addition, shortened burst acquisition mode needs to be added, since the cellular telephone under test 20 transmits shortened bursts initially when it is assigned a digital channel.

The analog mode FSK modem routine responds to commands received from the processor 12 that pertain to the analog mode of operation. The analog mode FSK modem routine must be modified so as to transmit words of a length that conforms to that of a base station, i.e., 40 bits as opposed to 48 bits. Likewise, the decoding of the words received by the transmitter/receiver unit 16 must also be modified accordingly. Finally, the analog mode FSK modem routine should transmit a busy/idle bit interleaved into control channel transmissions, as required by, e.g., the EIA/TIA/15/54-B standard or any other standard with which the present invention is configured to operate.

Modifications to the control program must also be made so that SAT is generated by instead of transponded to by the transmitter/receiver unit 16 and so that ST tone is detected instead of being generated.

Finally, a user interface routine within the conventional mobile unit that is modified for use as the transmitter/receiver unit 16, as well as call processing functions, may be deleted since they are implemented instead by the processor.

The RF interface unit 18 is a frequency transponder (or bidirectional frequency converter), as is known in the art. The RF interface unit 18 is described more completely below. In an alternative embodiment, the RF interface unit may be merely an RF signal path that couples the RF input/output of the transmitter/receiver unit to the RF input/output of the cellular telephone under test. In the alternative embodiment, RF circuits within the transmitter/receiver unit must be modified so that transmissions from the transmitter/receiver unit conform to, e.g., the EIA/TIA/IS-54-B standard for base stations, and so that it can receive transmissions that conform to, e.g., the EIA/TIA/IS-54-B standard for cellular telephones.

The cellular telephone under test 20 is a cellular telephone upon which the cellular automated test set 10 is to perform tests. The cellular automated test set 10 can perform tests on virtually any commercially available analog or TDMA cellular telephone. For example, a suitable cellular telephone for testing by the cellular automated test set 10 is available as model number M6100 from Hughes Network Systems of San Diego, Calif.

Figure 2:
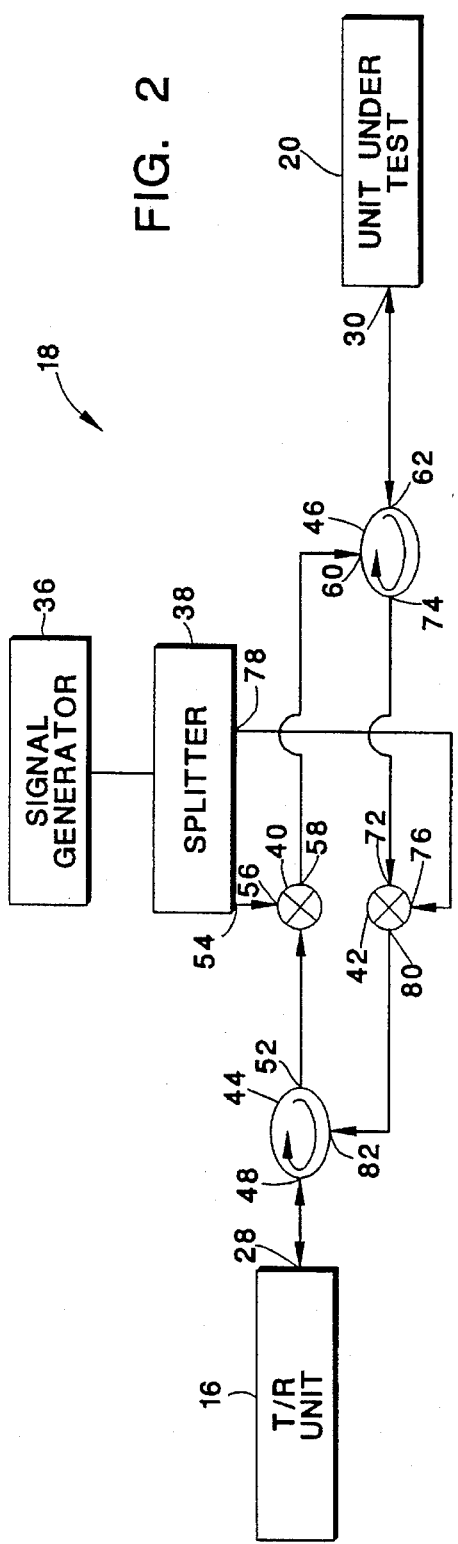
FIG. 2 is a block diagram of one embodiment of an RF interface unit suitable for use in the apparatus of FIG. 1.

Referring next to FIG. 2, a block diagram is shown of one embodiment of the RF interface unit 18.

Figure 3:
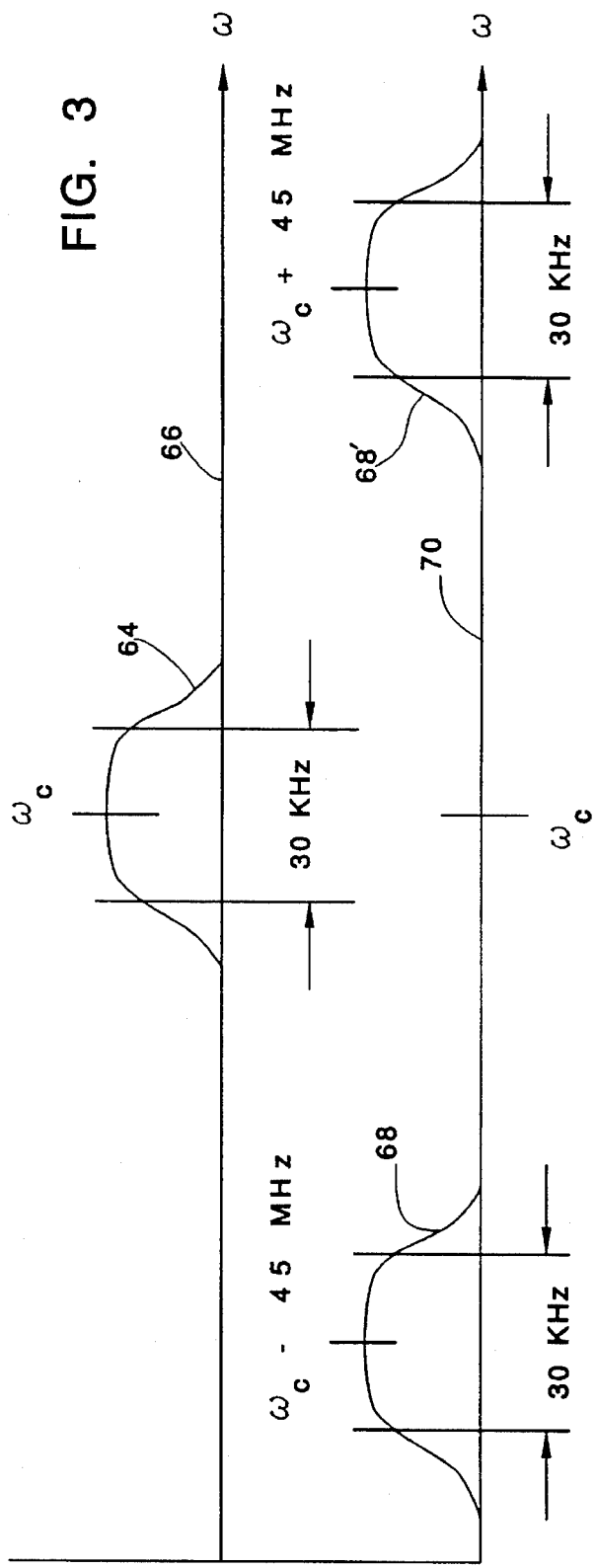
FIG. 3 is a graph representing frequency on the abscissa axis and gain on the ordinate axis, wherein the upper graph represents an input to the RF interface unit of FIG. 2 and the lower graph represents an output from such RF interface unit.

The RF interface unit 18 includes (1) a signal generator 36, (2) a splitter 38, (3) a first multiplier 40, (4) a second multiplier 42, (5) a first duplexer 44, and (6) a second duplexer 46. The RF input/output 28 of the transmitter/receiver unit 16 is coupled to an input/output 48 of the first duplexer 46, and a first input 50 of the first multiplier 40 is coupled to an output 52 of the first duplexer 44. The signal generator 36 generates a sinusoidal signal having a frequency of 45 MHz (the frequency difference between the transmit frequency of a cellular base station and a cellular telephone, and the receive frequency of the cellular base station and the cellular telephone, or mobile unit). The sinusoidal signal is passed through the splitter 38, and a first output 54 of the splitter 38 is coupled to a second input 56 of the first multiplier 40. An output 58 of the first multiplier 40 is coupled to an input 60 of the second duplexer 46. An input/output 62 of the second duplexer 46 is coupled to the RF input/output 30 of the cellular telephone under test 20. Thus when messages are received from the transmitter/receiver unit 16 they are passed through the first duplexer 44 to the first multiplier 40 and multiplied by the 45 MHz sinusoidal signal. As a result, frequency shifted sidebands (shifted by 45 MHz) are passed from the first multiplier through the second duplexer 46 to the cellular telephone under test 20. Such sidebands are illustrated in FIG. 3, wherein an input frequency spectrum 64, e.g., from the transmitter/receiver unit 16 is shown on an upper horizontal axis 66 (upper abscissa), and an output frequency spectrum 68, 68', e.g., from the first multiplier 40 is shown on a lower horizontal axis 70 (lower abscissa). As is known in the art, the cellular telephone under test 20 contains a bandpass filter that filters out the lower side band 68, i.e., the sideband that is shifted −45 MHz. In this way, the transmitter/receiver unit 16 is able to transmit and receive messages to the cellular telephone under test 20 in accordance with, e.g., the EIA/TIA/IS-54-B standard.

Similarly, the second multiplier 42 is coupled at a first input 72 to an output 74 of the second duplexer 46, and at a second input 76 to a second output 78 of the splitter 38. An output 80 of the second multiplier 42 is coupled to an input 82 of the first duplexer 44. As a result, frequency shifted sidebands 68, 68' (shifted by ±45 MHz) are passed from the second multiplier 42 and then through the first duplexer 44 to the transmitter/receiver unit 16. The sidebands 68, 68' illustrated in FIG. 3 are also exemplary of the sidebands generated by the second multiplier 42. The transmitter/receiver unit 16 also contains a bandpass filter that filters out the lower sideband 68, i.e., the sideband that is shifted −45 MHz. In this way, the cellular telephone under test 20 is able to transmit messages to the transmitter/receiver unit 16 in accordance with, e.g., the EIA/TIA/IS-54-B standard.

Figure 4:
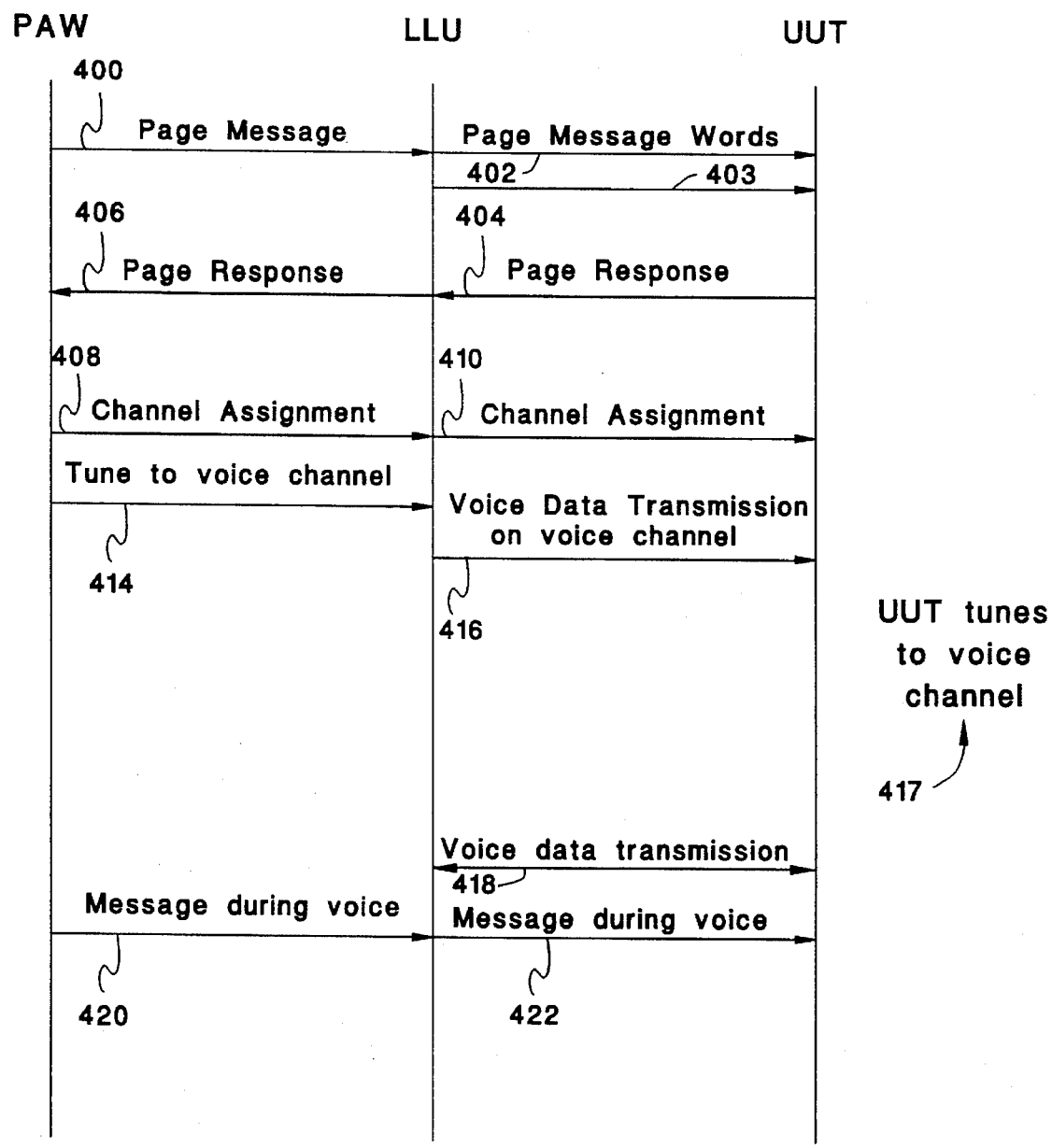
FIG. 4 is a representation of messages passed between a processor, a transmitter/receiver unit and a cellular telephone under test, as shown in FIG. 1, during a call setup procedure.

Referring next to FIG. 4, a representation is shown of the messages passed between the processor 12, the transmitter/receiver unit 16 and the cellular telephone under test 20 during a call setup procedure.

Initially a page message is sent 400 from the processor to the transmitter/receiver unit. The page message is sent in response to the control program as described generally in FIG. 6. The transmitter/receiver unit parses the page message into page message words that are then sent 402, 403 from the transmitter/receiver unit to the cellular telephone under test. The page message words are sent in response to the base station program as described generally in FIG. 5. In response to the page message words, the cellular telephone under test transmits 404 a page response to the transmitter/receiver unit. The transmitter/receiver unit and the processor receive the page response as described generally in FIGS. 8 and 9, respectively. The transmitter/receiver unit passes 406 the page response to the processor, and the processor responds by transmitting 408 a channel assignment to the transmitter/receiver unit. The transmitter/receiver unit passes 410 the channel assignment on to the cellular telephone under test. Next, the processor passes 414 a tune to voice channel signal to the transmitter/receiver unit, in response to which the transmitter/receiver unit tunes to the assigned voice channel. The transmitter/receiver unit then makes 416 a voice transmission to the cellular telephone under test on the voice channel and the cellular telephone under test then tunes 417 to the voice channel and transmits 418 a voice data transmission to the transmitter/receiver unit. Voice data transmissions are passed 418 between the transmitter/receiver unit and the cellular telephone under test until the processor transmits 420 a message during voice signal to the transmitter/receiver unit, which passes 422 the message during voice signal to the cellular telephone under test. The message during voice signal may be any of a plurality of message during voice signals defined, e.g., in the EIA/TIA/IS-54-B standard. One example of the message during voice signal is a handoff message signal with channel information, as described below.

Figure 5:
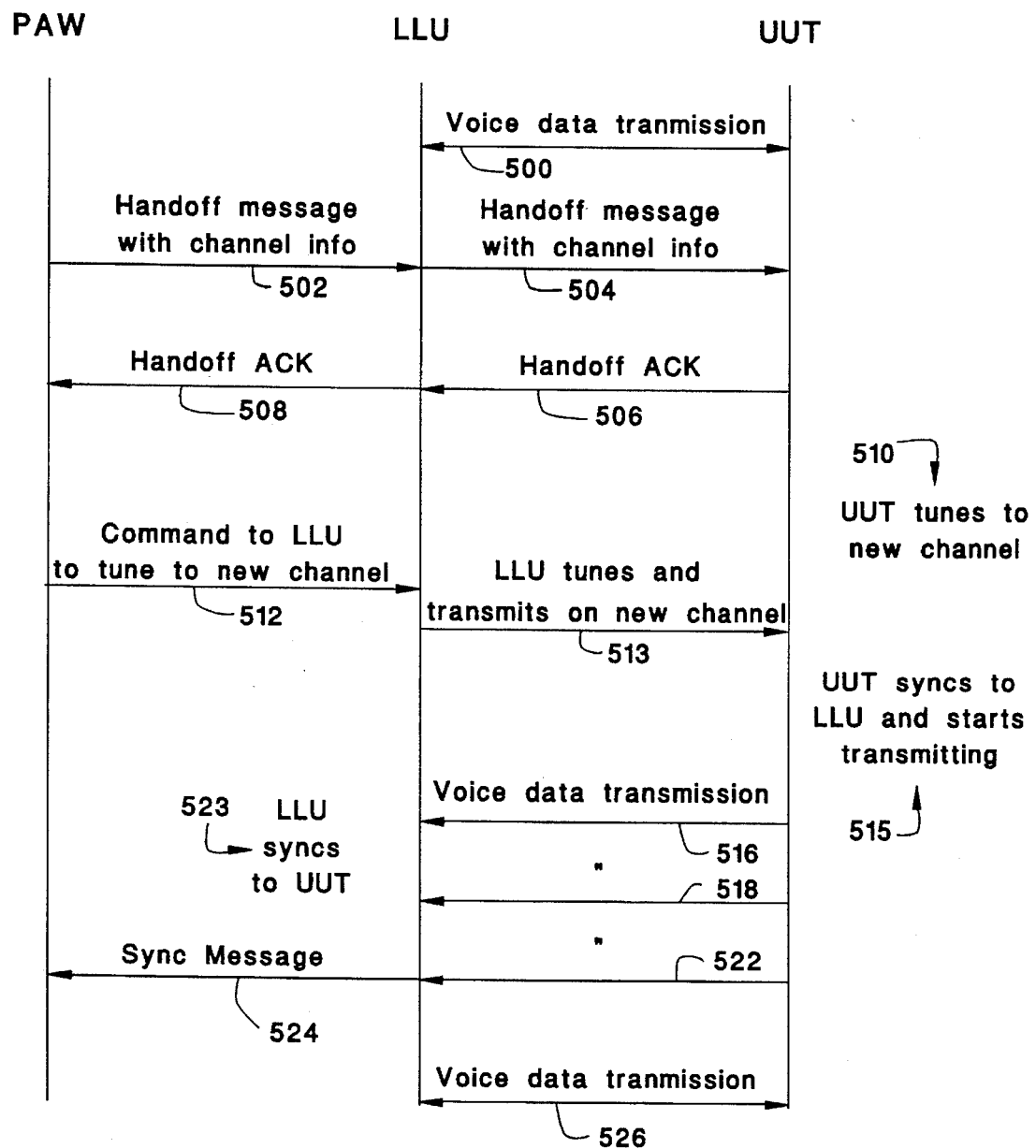
FIG. 5 is a representation of the messages passed between the processor, the transmitter/receiver unit, and the cellular telephone under test, as shown in FIG. 1, during a digital handoff procedure.

Referring next to FIG. 5, a representation is shown of messages that are passed between the processor 12, the transmitter/receiver unit 16 and the cellular telephone under test 20 during a handoff procedure.

Initially, voice data transmissions are being passed 500 from the transmitter/receiver unit to the cellular telephone under test and similarly back from the cellular telephone under test to the transmitter/receiver unit. When the processor is instructed, e.g., by the operator of the cellular automated test set, to initiate a digital handoff, the processor passes 502 a handoff message signal with channel information contained therein to the transmitter/receiver unit. The transmitter/receiver unit passes 504 the digital handoff message signal to the cellular telephone under test. In response to the handoff message, the cellular telephone under test transmits 506 a handoff acknowledge signal to the transmitter/receiver unit in response to which the transmitter/receiver unit passes 508 the handoff acknowledged signal to the processor. At the same time, the cellular telephone under test tunes 510 to the new voice channel as specified by the channel information. Next, the processor sends 512 a command to the transmitter/receiver unit that instructs the transmitter/receiver unit to tune to a new voice channel. The transmitter/receiver unit tunes to the new channel and transmits 513 on the new channel to the cellular telephone under test. In response to receiving the transmission from the transmitter/receiver unit, the cellular telephone unit under test synchronizes 515 with the transmitter/receiver unit. After synchronizing, the cellular telephone under test then begins to transmit 516, 518, 522 voice data transmissions to the transmitter/receiver unit. In response to receiving the voice data transmissions from the cellular telephone under test, the transmitter/receiver unit synchronizes 523 with the cellular telephone under test and generates a sync message signal that is sent 524 to the processor. The sync message signal indicates to the processor that both the transmitter/receiver unit and the cellular telephone under test have synchronized and are now tuned to the new voice channel. The transmitter/receiver unit and the cellular telephone under test then transmit and receive 526 voice data transmissions in a manner similar to that in which they transmitted and received 500 voice data transmissions before the handoff procedure began.

Figures 6, 7:
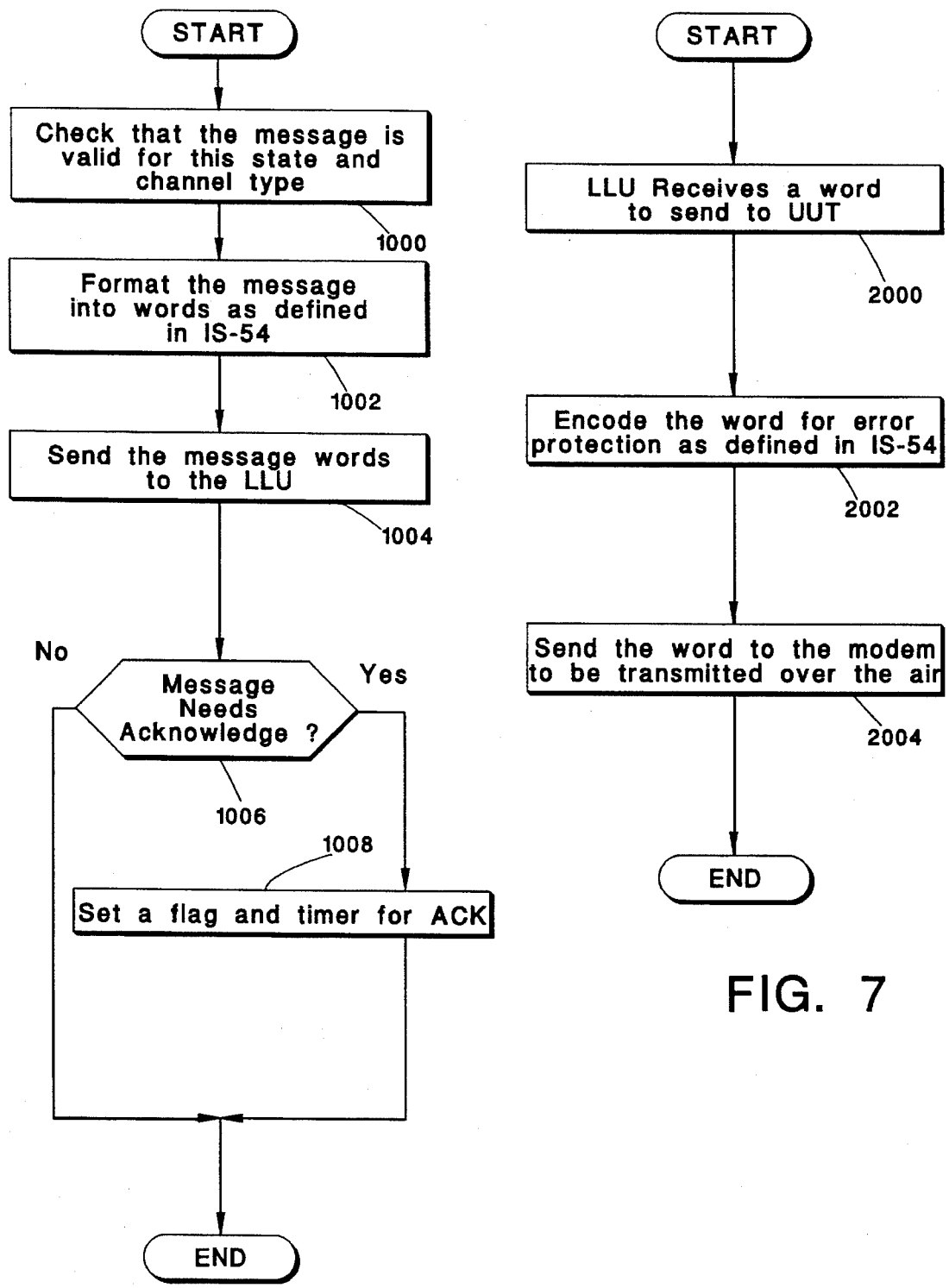
FIG. 6 is a flow diagram of the steps traversed by a processor that is a part of the apparatus of FIG. 1 in response to a control program during a base-station-initiated message sequence.
FIG. 7 is a flow diagram of the steps traversed by a transmitter/receiver unit that is a part of the apparatus of FIG. 1 in response to a base station program during the base-station-initiated message sequence.

Referring next to FIG. 6, a flow diagram is shown of the steps traversed by the processor 12 in response to the control program during a base-station-initiated message sequence. One example of a base station-initiated message sequence is the transmission of the handoff message signal as shown in FIG. 5.

The control program preferably runs in a graphical user interface (GUI) environment such as MICROSOFT WINDOWS Version 3.1. The GUI environment permits multiple instances of the control program to execute on the processor 12. By using a multiplexer (not shown) on the data port 22 of the processor 12, multiple transmitter/receiver units can be coupled to the processor 12. As a result, the cellular automated test set 10 can test several cellular telephones simultaneously using the processor 12 and the multiple transmitter/receiver units. Note that as an alternative to the multiplexer, several data ports may be used within the processor 12, each of which are accessed by a separate instance of the control program.

When an operator of the cellular automated test set 10 instructs the processor 12 to begin a base-station-initiated message sequence, e.g., by selecting one of a plurality of possible messages from a pull down menu, e.g., the handoff message, the control program in the memory 32 of processor 12 first checks (Block 1000) to see that the message that the operator has selected to send is valid for the current state, i.e., wait for answer, conversation, etc., and channel type, i.e., digital or analog, of the cellular telephone under test 20. The plurality of possible messages preferably includes all possible messages that can be sent from the transmitter/ receiver unit 16 to the cellular telephone under test 20 in accordance with, e.g., the EIA/TIA/IS-54-B standard. Because the control program is stored in the memory of the processor 12, it can easily be modified to accommodate other cellular communications standards that may from time to time be adopted. If the message is invalid, either for the current state or channel type or both, either an error message is generated or the operator can be prevented from selecting the invalid message. After having selected a valid message to send to the cellular telephone under test 20, the message is formatted (Block 1002) into words as defined in, e.g., the EIA/TIA/IS-54-B standard. Next, the control program sends (Block 1004) a data signal indicative of the message to the transmitter/receiver unit 16. In the event the message requires an acknowledgement from the cellular telephone under test 20 (Block 1006), a flag is set (Block 1008) within the control program and a timer is set (Block 1008), which defines a period during which the control program will wait for the acknowledgement before issuing an error message. The time period depends on the message type. After setting the flag and the timer, or in the event the message does not require an acknowledgement (Block 1006), the base-station-initiated message sequence terminates within the processor 12.

Referring next to FIG. 7, a flow diagram is shown of the steps traversed by transmitter/receiver unit 16 in response to a base station program during the base-station-initiated message sequence.

The transmitter/receiver unit 16 receives (Block 2000) the message words sent by the processor 12, as described above. One example of message words that may be received is the handoff message signal shown in FIG. 5. The words are encoded (Block 2002) for error protection as defined in, e.g., the EIA/TIA/IS-54-B standard and the encoded word is sent (Block 2004) to a modem (modulator-demodulator) within the transmitter/receiver unit 16 and transmitted to the cellular telephone under test 20. Such modems are known in the art of cellular telephones.

Figure 8:
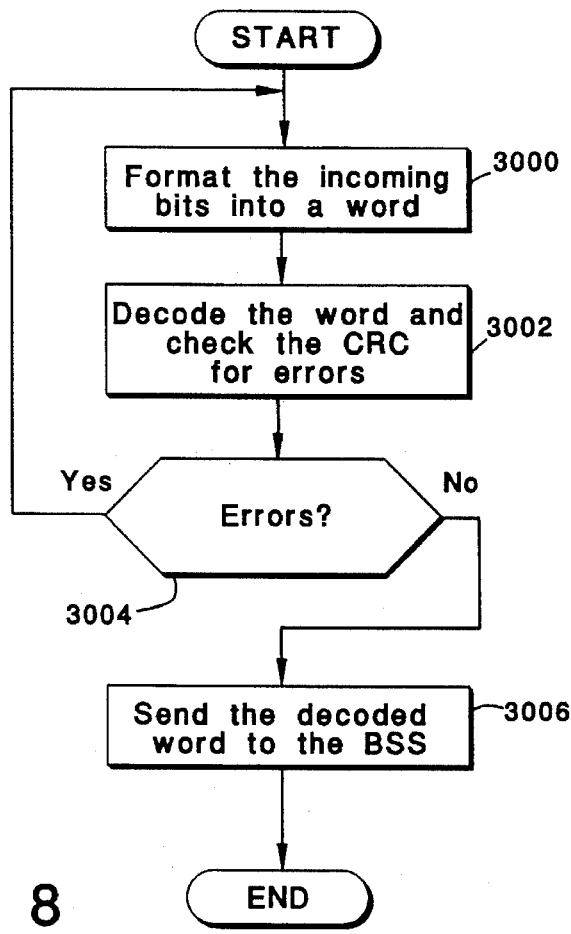
FIG. 8 is a flow diagram of the steps traversed by the transmitter/receiver unit that is a part of the apparatus of FIG. 1 in response to the base station program during a mobile-unit-initiated message sequence.

Referring next to FIG. 8, a flow diagram is shown of the steps traversed by the transmitter/receiver unit 16 in response to the base station program during a mobile-unit-initiated message sequence. The steps shown in FIG. 4 are also traversed when the cellular telephone under test 20 responds to the base-station-initiated message sequence described above. One example of a response to the base-station-initiated message is the handoff ACK signal shown in FIG. 5.

During the mobile unit initiated message sequence, which may be initiated by the cellular telephone under test 20 in response to the base-station initiated message sequence, described above, a stream of bits (or bitstream) is received into the transmitter/receiver unit 16 and formatted into a word (Block 3000). The word is decoded (Block 3002) and a cyclic redundancy check (CRC) is performed (Block 3002) on the word in order to check for errors (Block 3004). In the event the word contains errors, it is discarded by the transmitter/receiver unit 16 and the transmitter/receiver unit 16 waits for the next bitstream to arrive. In the event the word does not contain errors, the word is sent (Block 3006) to the processor 12.

Figure 9:
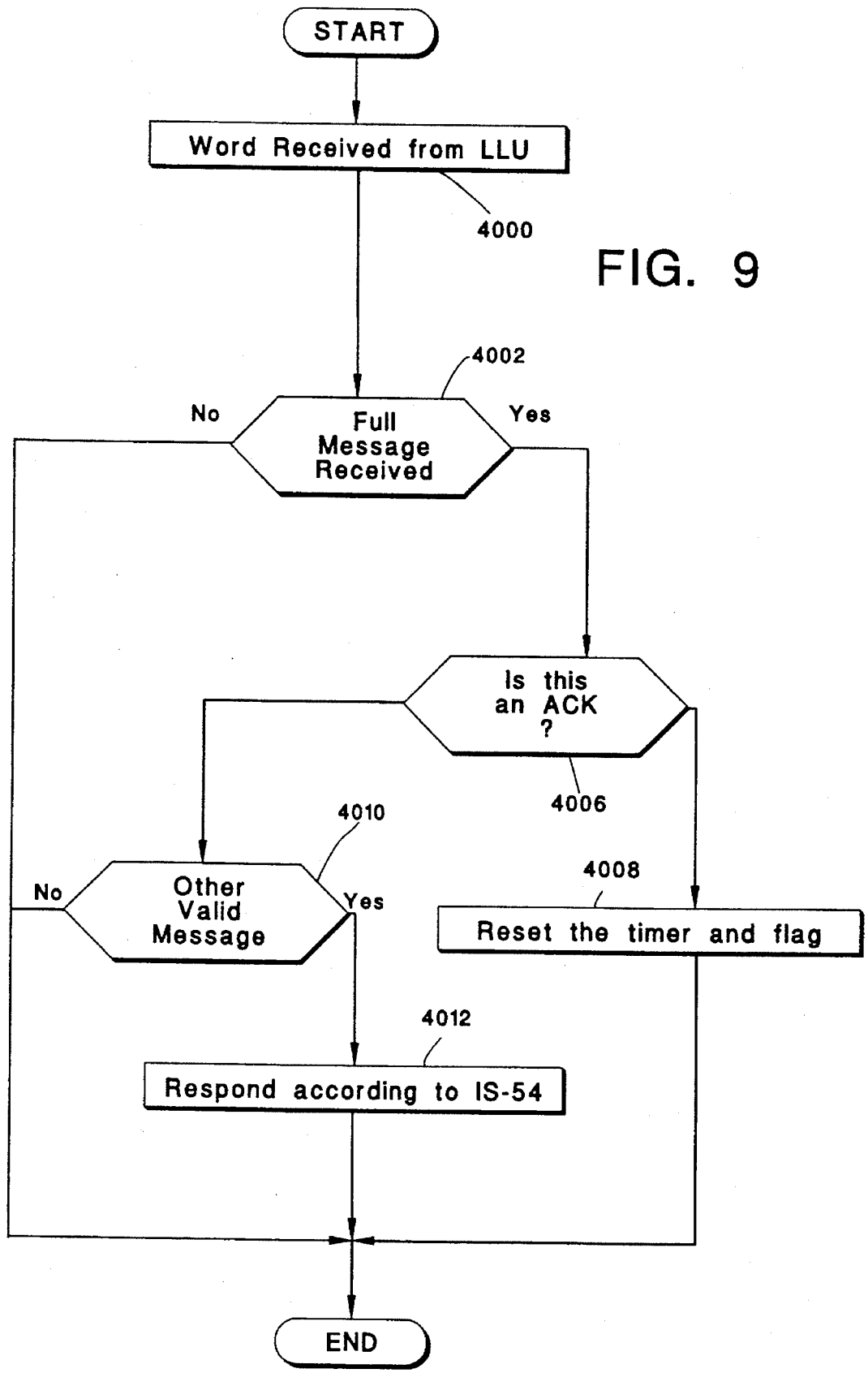
FIG. 9 is a flow diagram of the steps traversed by the processor that is a part of the apparatus of FIG. 1 in response to the control program during the mobile-unit-initiated sequence.

Referring next to FIG. 9, a flow diagram is shown of the steps traversed by the processor 12 in response to the control program during the mobile-unit-initiated sequence.

When a data signal indicative of the word is received (Block 4000) by the processor 12 from the transmitter/receiver unit 16, a check is performed (Block 4002) to see whether a full message (which may consist of several words) has been received. One example of a full message that is received by the processor is the handoff ACK signal shown in FIG. 5. In the event a full message has not been received (Block 4002), the word is stored within the processor 12 and the processor 12 waits for additional words. When a full message has been received (Block 4002), the processor 12, in response to the control program, checks (Block 4006) to see whether the message is an acknowledge (ACK), as would be the case if the cellular telephone under test 20 were responding to the base-station-initiated message sequence described above, e.g., the handoff message signal. In the event the message is an acknowledge (Block 4006), the timer and flag are reset (Block 4008). In the event the message is not an acknowledge (Block 4006), the processor 12 checks (Block 4010) whether the message is a valid message. If the message is not a valid message (Block 4010), it is discarded, and if the message is a valid message (Block 4010), the processor generates (Block 4012) an appropriate response, if required, in accordance with, e.g., the EIA/TIA/IS-56-B standard.

Thus, the invention provides an improved apparatus and method for making the same for testing cellular telephones wherein all possible messages can be sent and received by the transmitter/receiver unit 16 (or base station simulator), and responses from the cellular telephone under test 20 are checked to see whether they are appropriate responses, in accordance with, e.g., the EIA/TIA/IS-54-B Standard.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for testing a cellular telephone, the cellular telephone having an RF input/output, the apparatus including:

an RF interface coupled to the RF input/output of the cellular telephone, the RF interface comprising:

a first multiplier coupled to the cellular telephone, and to a transmitter/receiver, a signal splitter coupled at a first splitter output to the first multiplier, a signal generator coupled to a splitter input of the signal splitter, and a second multiplier coupled to a second splitter output of the splitter to the RF input/output of the cellular telephone and to transmitter/receiver;

the transmitter/receiver coupled at an RF input/output of the transmitter-receiver to the first and second multipliers, the transmitter/receiver including means for transmitting a first message signal to the cellular telephone via the RF interface and means for receiving a second message signal from the cellular telephone via the RF interface;

a data interface coupled to a data port of the transmitter-receiver; and a processor coupled to the data interface, the processor including means for transmitting a first data signal to the transmitter-receiver via the data interface and means for receiving a second data signal from the transmitter-receiver via the data interface, the transmitter/receiver including means for generating the first message signal in response to the first data signal and means for generating the second data signal in response to the second message signal.

2. The apparatus of claim 1 wherein said RF interface is a frequency transponder comprising:
   a first duplexer coupled at a first input/output to said transmitter/receiver;
   wherein the first multiplier is coupled to the transmitter/receiver via a first output of the first duplexer;
   wherein the second multiplier is coupled to the transmitter/receiver via a first input of the first duplexer; and
   a second duplexer coupled at a second input to the first multiplier, at a second output to the second multiplier and at a second input/output to said cellular telephone, wherein the first multiplier is coupled to the cellular telephone via the second input of the second duplexer, and wherein the second multiplier is coupled to the cellular telephone via the second output of the first duplexer.

3. The apparatus of claim 1 wherein said data interface converts twelve-volt data signals from said processor into five-volt data signals that are delivered to said transmitter/receiver, and five-volt data signals from said transmitter/receiver into twelve-volt data signals that are delivered to said processor.

4. The apparatus of claim 1 wherein said processor is a personal computer.

5. A method for making a cellular automated test set, the method including:
   (a) coupling a first cellular telephone at an RF input/output of the first cellular telephone to an RF interface 9, the first cellular telephone being programmed with a mobile unit program;
   (b) coupling the RF interface to a second cellular telephone at an RF input/output of the second cellular telephone, the coupling of the RF interface to the second cellular telephone comprising:
      coupling a first multiplier to the first cellular telephone and to the second cellular telephone,
      coupling a signal splitter at a first splitter output to the first multiplier.
      coupling a signal generator to a splitter input of the signal splitter, and
      coupling a second multiplier to a second splitter output of the signal splitter, to the first cellular telephone and to the second cellular telephone;
   (c) programming the second cellular telephone with a base station program, wherein the first cellular telephone uses a mobile unit protocol in response to the mobile unit program to transmit a first message signal to the second cellular telephone and wherein the second cellular telephone uses a base station protocol in response to the base station program to transmit a second message signal to the first cellular telephone; and
   (d) coupling the second cellular telephone to a processor via a data interface, wherein the second cellular telephone transmits and receives data signals to and from the processor via the data interface;
   (e) programming the processor with a control program in response to which the processor generates the data signals, wherein the second cellular telephone transmits the second message signal to the first cellular telephone using the base station protocol in response to the data signals.

6. The method of claim 5 wherein step (b) includes:
   coupling a first duplexer at a first input/output to said second cellular telephone;
   coupling the first multiplier to a first output of the first duplexer, wherein the first multiplier is coupled to the first cellular telephone via the first output of the first duplexer;
   coupling the second multiplier to a first input of the first duplexer, wherein the second multiplier is coupled to the second cellular telephone via the first input of the first duplexer; and
   coupling a second duplexer at a second input to the first multiplier, at a second output to the second multiplier and at a second input/output to said first cellular telephone, wherein the first multiplier is coupled to the first cellular telephone via the second input of the second duplexer, and wherein the second multiplier is coupled to the first cellular telephone via the second output of the second duplexer.

7. The method of claim 5 wherein said data interface in step (d) converts twelve-volt data signals from said processor into five-volt data signals that are delivered to said second cellular telephone, and five-volt data signals from said second cellular telephone into twelve-volt data signals that are delivered to said processor.

8. The method of claim 5 wherein said processor is a personal computer.

9. An apparatus for testing a first cellular telephone, wherein the first cellular telephone communicates using a mobile protocol, the apparatus including:
   an RF interface coupled to an RF input/output of the first cellular telephone, the RF interface comprising:
      a first multiplier coupled to the RF input/output of the first cellular telephone and to an RF input/output of a second cellular telephone,
      a signal splatter coupled at a first splitter output to the first multiplier,
      a signal generator coupled to a splitter input of the splitter, and
      a second multiplier coupled to a second splitter output of the signal splitter, the RF input/output of the first celluar telephone and to the RF input/output of the second cellular telephone;
   the second cellular telephone coupled at the RF input/output of the second cellular telephone to the first multiplier and the second multiplier of the RF interface, the second cellular telephone including means for transmitting a first message to the first cellular telephone via the RF interface and means for receiving a second message from the first cellular telephone via the RF interface; and
   a memory device within the second cellular telephone, the memory device including means for storing a base station program, the base station program including means for defining a base station protocol, whereby the second cellular telephone communicates with the first cellular telephone via the RF interface using the base station protocol.

10. The apparatus of claim 8 wherein said RF interface is a frequency transponder comprising:
    a first duplexer coupled at a first input/output to said second cellular telephone, at a first output to the first multiplier, and at a first input to the second multiplier;
    wherein the first multiplier is coupled to the RF input/output of the second cellular telephone via the first output of the first duplexer;
    wherein the second multiplier is coupled to the RF input/output of the second cellular telephone via the first input of the first duplexer; and a second duplexer coupled at a second input to the first multiplier, at a second output to the second multiplier and at a second input/output to said first cellular telephone, wherein the first multiplier is coupled to the first cellular telephone via the second input of the second duplexer, and wherein the second multiplier is coupled to the first cellular telephone via the second output of the second duplexer.

11. The apparatus of claim 9 including:

a data interface coupled to a data port of said second cellular telephone; and a processor coupled to the data interface, wherein the processor transmits a first data signal to and receives a second data signal from said second cellular telephone via the data interface, wherein said first message signal is generated in response to said first data signal and the second data signal is generated in response to said second message signal.

12. The apparatus of claim 9 wherein:

said processor is a personal computer; and said data interface converts twelve-volt data signals from said processor into five-volt data signals that are delivered to said second cellular telephone, and five-volt data signals from said second cellular telephone into twelve-volt data signals that are delivered to said processor.

13. The apparatus of claim 9 wherein said RF interface increases the frequency of a first RF signal from said RF input/output of said first cellular telephone by 45 megahertz and delivers the first RF signal, having has its frequency increased 45 megahertz, to said second cellular telephone, and increases the frequency of a second RF signal from said RF input/output of said second cellular telephone by 45 megahertz and delivers said second RF signal, having had its frequency increased by 45 megahertz, to said first cellular telephone.

* * * * *